United States Patent
Kelkar

(10) Patent No.: US 7,035,652 B1
(45) Date of Patent: Apr. 25, 2006

(54) WIRELESS COMMUNICATION STRUCTURES AND METHODS WITH ENHANCED RANGE AND PERFORMANCE

(75) Inventor: Kris Kelkar, Camarillo, CA (US)

(73) Assignee: Calamp Corp., Oxnard, CA (US)

( * ) Notice: Subject to any disclaimer, the term of this patent is extended or adjusted under 35 U.S.C. 154(b) by 219 days.

(21) Appl. No.: 10/764,077

(22) Filed: Jan. 23, 2004

Related U.S. Application Data

(60) Provisional application No. 60/446,946, filed on Feb. 11, 2003.

(51) Int. Cl.
*H04Q 7/20* (2006.01)

(52) U.S. Cl. .............................. 455/456.6; 455/456.1; 455/63.4; 455/452.1; 455/65; 455/562.1; 455/504; 455/506

(58) Field of Classification Search ............... 455/63.4, 455/65, 504–506, 562.1, 456.1
See application file for complete search history.

(56) References Cited

U.S. PATENT DOCUMENTS

| | | | |
|---|---|---|---|
| 5,371,734 A | 12/1994 | Fischer | 370/18 |
| 6,005,853 A | 12/1999 | Wang et al. | 370/332 |
| 6,006,110 A * | 12/1999 | Raleigh | 455/561 |
| 6,577,609 B1 | 6/2003 | Sharony | 370/312 |
| 6,597,683 B1 * | 7/2003 | Gehring et al. | 370/348 |
| 6,650,881 B1 * | 11/2003 | Dogan | 455/276.1 |
| 6,839,574 B1 * | 1/2005 | Petrus et al. | 455/562.1 |

OTHER PUBLICATIONS

Bianchi, Giuseppe, "Performance Analysis of the IEEE 802.11 Distributed Coordination Function", IEEE Journal on Selected Areas in Communications, vol. 18, No. 3, Mar., 2000, pp. 535-547.
Clark, Martin, et al., Outdoor IEEE 802.11 Cellular Networks: Radio Link Performance, Proc. IEEE ICC 2002.
Leung, Kin K., et al., "Outdoor IEEE 802.11 Cellular Network: MAC Protocol Design and Performance", AT&T Research Labs, Morristown, New Jersey.

* cited by examiner

*Primary Examiner*—Nick Corsaro
*Assistant Examiner*—Emem Ekong
(74) *Attorney, Agent, or Firm*—Koppel, Patrick & Heybl

(57) ABSTRACT

Wireless communication structures and methods are provided that enhance range and performance via managed access to a wireless communication medium between system clients. The access is configured to maintain the low equipment costs and widespread equipment availability of standards-based communication systems. In particular, the structures include at least one antenna, a processor that spatially processes receive signals from the antenna, a media access controller that compares the age of receive location information with a predetermined time coherence, a location-information transformer that transforms the receive location information into transmit location information, and a transmit spatial processor configured to provide a transmit signal to the antenna that is spatially processed in accordance with the transmit location information if the age is less than the time coherence and spatially processed in accordance with predetermined location information if the age exceeds the time coherence. A database is preferably provided for storage of the receive location information and the age.

35 Claims, 8 Drawing Sheets

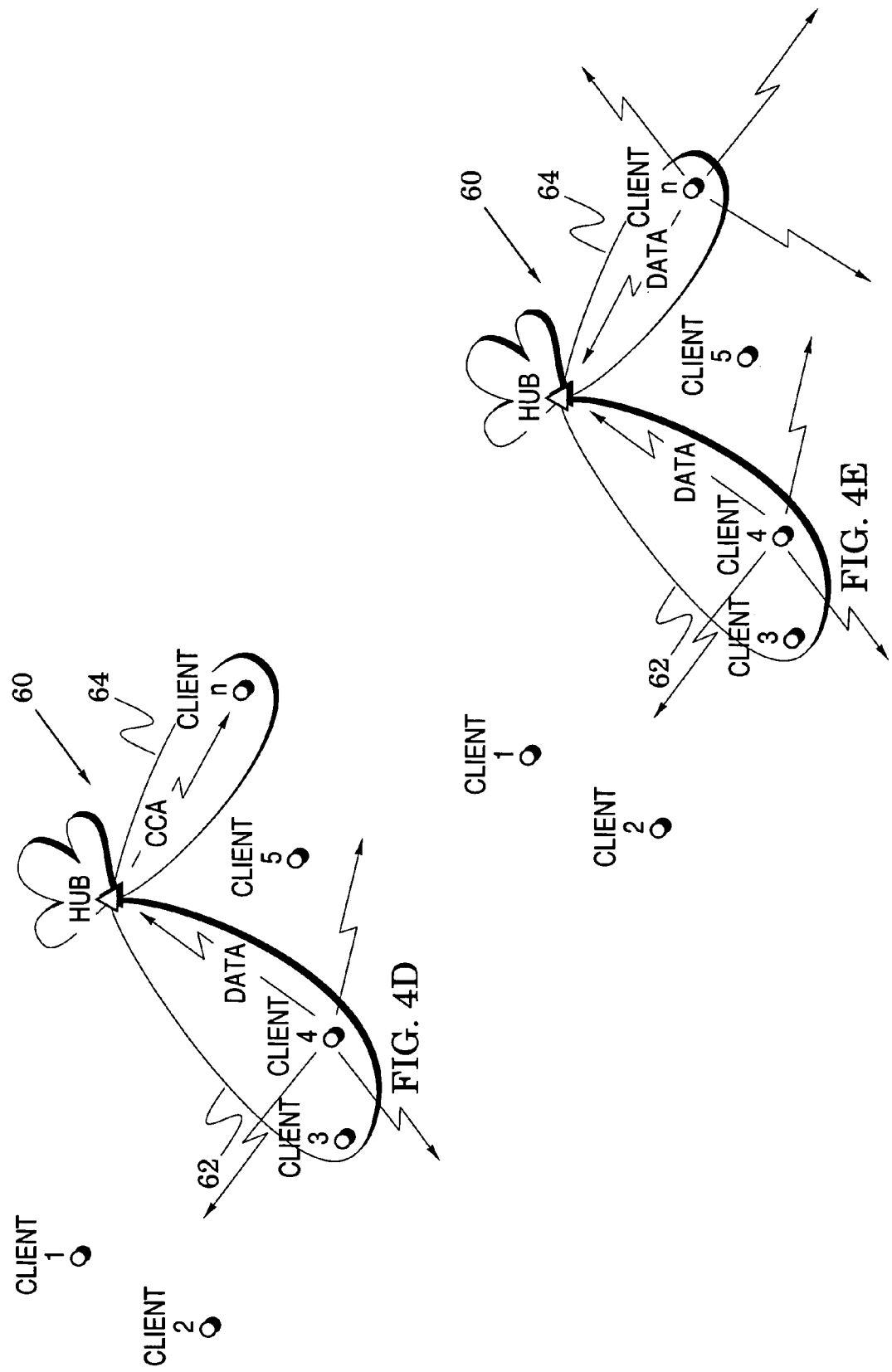

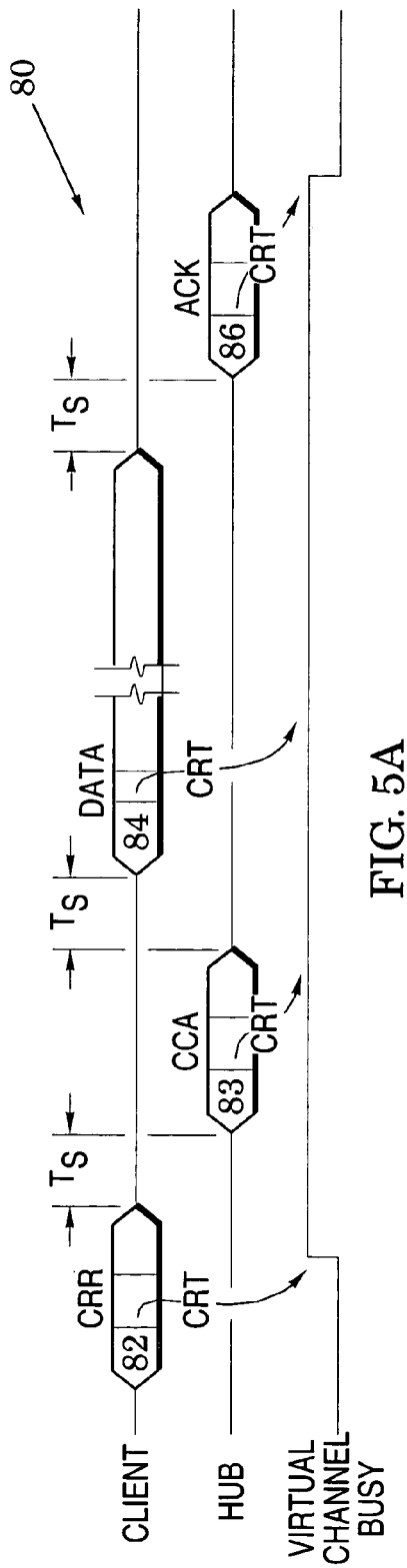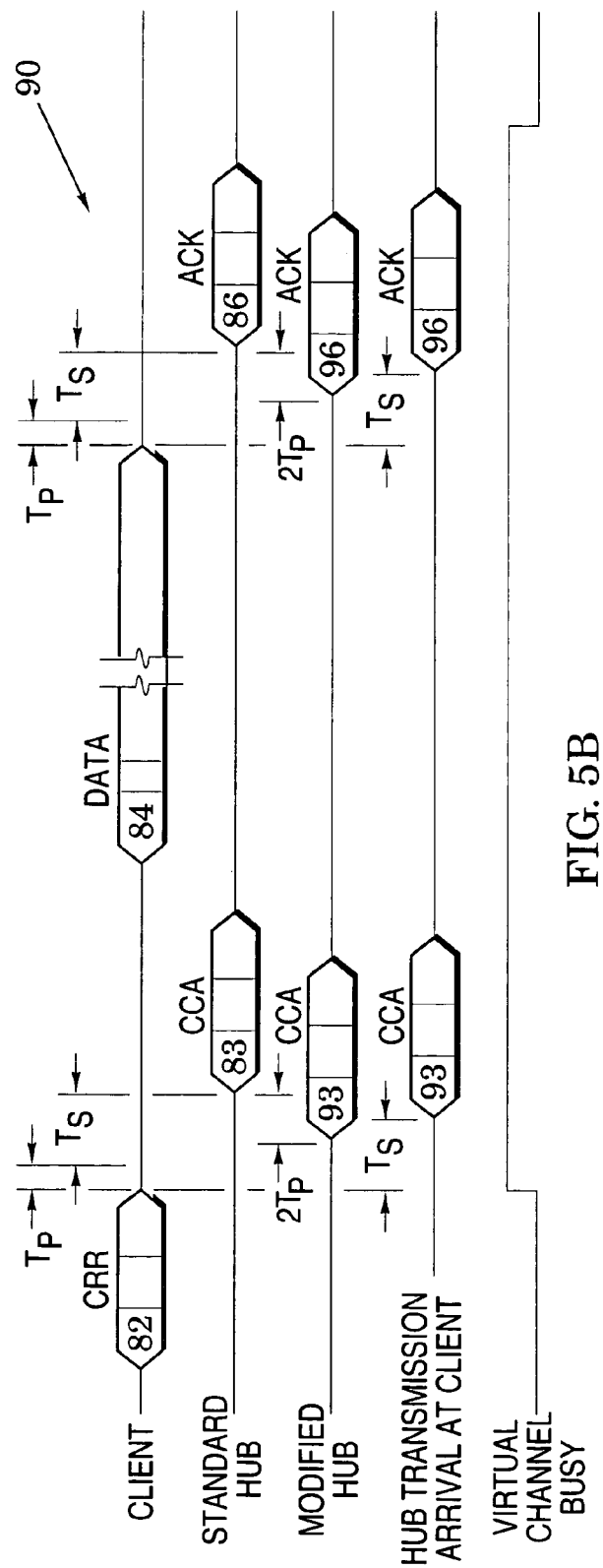
FIG. 5A
FIG. 5B

WIRELESS COMMUNICATION STRUCTURES AND METHODS WITH ENHANCED RANGE AND PERFORMANCE

CROSS REFERENCES TO RELATED APPLICATIONS

This application claims the benefit of U.S. Provisional Application Ser. No. 60/446,946 filed Feb. 11, 2003.

BACKGROUND OF THE INVENTION

1. Field of the Invention

The present invention relates generally to wireless communication systems and more particularly, to media access control in these systems.

2. Description of the Related Art

Smart antennas (part of a communication art also known as spatial processing) have been proposed for various types of communication system applications. Generally, spatial processing promises to improve coverage range, data capacity and reliability of wireless communications systems. A few proprietary wireless communications systems that incorporate spatial processing are under development. These proprietary systems, however, typically lack the broad vendor support and volume deployment of standards-based systems, and they generally carry higher equipment costs.

In contrast, a few standards-based wireless communications systems have been widely deployed but they do not incorporate spatial processing. Compared to the proprietary systems, the standards-based systems generally suffer from limited range, limited capacity and poor link reliability.

The integration of spatial processing into a standards-based system that was not designed to incorporate such processing is a substantial challenge. Spatial processing is intended to optimize communication between a specific transmitter and a specific receiver. However, in a dynamically changing channel (either caused by the movement of the transmitter, the movement of the receiver or the movement of objects that affect signal propagation), spatial processing can have unpredictable effects on the ability of other receivers to receive transmissions that have been spatially processed for reception by a specific receiver.

An exemplary standards-based system utilizes Carrier Sense Media Access/Collision Avoidance (CSMA/CA) in which a number of system mechanisms have been provided to properly manage access to the network. For example, one mechanism involves the basic premise of assessing if the channel is busy prior to initiating a transmission. If a system device wishes to initiate a transmission, it first tests whether the channel is busy by sensing received signal energy. If the channel is not busy for a designated period of time $T_L$, then the device may transmit. If the channel is found to be busy, then the device goes through an algorithmic back-off which, in effect, waits for a random amount of time before trying again.

Upon proper reception of a unicast packet (data packet sent to one respective device) by the designated recipient, that recipient responds with an acknowledgement packet within a designated period of time $T_S$. If no acknowledgement is received, the original transmitter assumes that the packet was not received due to a collision or other bad channel condition and waits for a random amount of time prior to trying to retransmit the lost packet. Generally, $T_L$ is greater than $T_S$ to give priority to response packets (e.g., acknowledgements) over new transactions (wherein the term "transaction" refers to the process of transmitting a packet and receiving a response).

Additional mechanisms have been added to CSMA/CA systems to improve network performance by minimizing time wasted in improperly received transmissions that were caused by bad channel conditions or collisions. One example of such a mechanism is a channel reservation time (CRT) that is maintained by all members of the network. In such a system, most transmitted packets contain a time value for which the channel must be reserved, in order to complete an entire transaction. All devices not engaged in the transaction but which can properly receive any message with a CRT, use this information to allow the transaction to complete before attempting to access the channel. The use of CRTs enhances network behavior when certain wireless devices cannot hear transmissions from other wireless devices but do communicate with a communication hub. In such scenarios, sensing received signal energy on the channel is not sufficient to determine for how long the channel is in use. Therefore, the CRT creates a virtual channel busy indicator that tells the device that the channel is expected to be busy.

Another mechanism to improve network performance is the use of short channel reservation requests (CRR) that are sent prior to transmitting data. In such an instance, the device transmitter waits the allotted time to ensure that the channel is not busy and then sends a short CRR to the hub requesting the channel for a specific period of time. The hub responds with a clear channel acknowledgement (CCA) indicating that the channel is indeed clear and that the channel is reserved for the transmitting device. The CCA generally reserves the channel (i.e., it contains a CRT) for the expected time required for the entire transaction (including necessary acknowledgements).

The original transmitter then proceeds by transmitting its data packet. These transmissions are separated by a time period ($T_S$) and all of them together comprise a transaction. In this transaction, since the hub is transmitting either a CCA or a CRR, it is assumed that all members of the network are able to receive one of these (with its associated CRT) and therefore will not attempt to transmit until the transaction is complete.

Still another mechanism for improving network performance is the use of packet fragmentation. This allows a transmitting device to break a communication packet down into smaller packets and transmit them separately. In poor channel conditions, this approach has advantages because lost packets will now cause less loss of data, and therefore less time lost to retransmission. Generally, each transmitted packet fragment is acknowledged by the receiver upon proper reception. This allows the transmitter to immediately resend lost packets.

The balancing mechanism to packet fragmentation is packet concatenation. This mechanism allows the transmitter to concatenate short packets together to allow them to be transmitted within one larger transmission. Every acknowledgement and every CRR/CCA add a fixed overhead to the transmission of each packet that they correspond to. Because they are intended for reception by all network members, they are generally sent at the lowest possible data rate (e.g., lowest order of modulation, greatest spreading (in the case of spread spectrum systems), and greatest amount of error correction overhead) allowed in the network so that the added overhead is significant. Fewer packets are lost during good channel conditions with channel reservation. Accordingly, packet concatenation reduces overhead during these system conditions.

In contrast to these CSMA/CA system mechanisms, spatial processing utilizes characteristics of the channel that are unique to the relative location of a transmitter and a receiver to optimize the transmission or reception of signals to or from a particular communication device. This is difficult to implement in the media access control (MAC) protocols of CSMA/CA because they generally do not include prior knowledge of transmission directions (hub to client or client to hub) nor which client will be transmitting.

Additionally, in dynamic channel conditions in which the channel or location of the transmitter or receiver changes over the timeframe of a few packets, optimization of transmit spatial processing requires regular monitoring of the channel/location of the involved transmitter and receiver—usually through the reception process. Therefore, a relatively static database that maintains location and channel condition information is insufficient, as the required information can change and mechanisms in the MAC must be utilized to provide the necessary information for periodic updates.

Although connection-oriented MACs have been provided in some proprietary wireless communications systems (to maintain a connection between a transmitter and a receiver so that beamforming may be initially set and then slowly adjusted to manage spatial processing), these connection-oriented MACs differ substantially from contention-based MACs of CSMA/CA system and, accordingly, they are difficult to integrate into such systems.

BRIEF SUMMARY OF THE INVENTION

The present invention is directed to wireless communication structures and methods that enhance range and performance via managed access to a wireless communication medium between system clients.

The novel features of the invention are set forth with particularity in the appended claims. The invention will be best understood from the following description when read in conjunction with the accompanying drawings.

BRIEF DESCRIPTION OF THE DRAWINGS

FIG. 5A is a time diagram of communication events with a conventional wireless communication device, FIG. 5B is a time diagram of communication events with the wireless communication device of FIG. 1.

DETAILED DESCRIPTION OF THE INVENTION

The present invention seeks to improve wireless network performance while also maintaining the low equipment costs and widespread equipment availability of standards-based communication systems. Accordingly, it recognizes that spatial processing must be selectively integrated and preferably utilizes existing standards-based mechanisms.

In particular, embodiments of the invention provide mechanisms that facilitate the integration of spatial processing into communication devices (e.g., a communication hub), accommodate delays associated with the extended coverage range that results from that integration, maintain communication with existing standards-based clients, retain the low cost and widespread availability of standards-based equipment for large numbers of system clients, and address other limitations in existing standards-based communication hubs.

Although these embodiments are preferably directed to communication hubs to thereby reduce changes (and corresponding costs) in large numbers of client devices, the teachings of the invention can also be used to implement spatial processing in any communication device (e.g., at the client end of communication networks).

For exemplary purposes, much of the following description is directed to integration of beamforming into CSMA/CA MACs, but the invention's teachings extend to other forms of spatial processing and other contention, polling or reservation based MACs. The description generally assumes that a network hub has spatial processing capability and needs to form beams to clients in the network. For descriptive simplicity, a number of acronyms are used in the description. Although some have already been introduced, all of these acronyms (and other communication terms) are listed below for convenient reference.

| Acronym List | |
|---|---|
| CSMA/CA | Carrier Sense Media Access/Collision Avoidance |
| $T_L$ | wait time to determine that a channel is available |
| $T_S$ | time provided for acknowledgment |
| CRT | channel reservation time |
| CRR | channel reservation request |
| CCA | clear channel acknowledgement |
| MAC | media access control (controller) |

Figure 1:
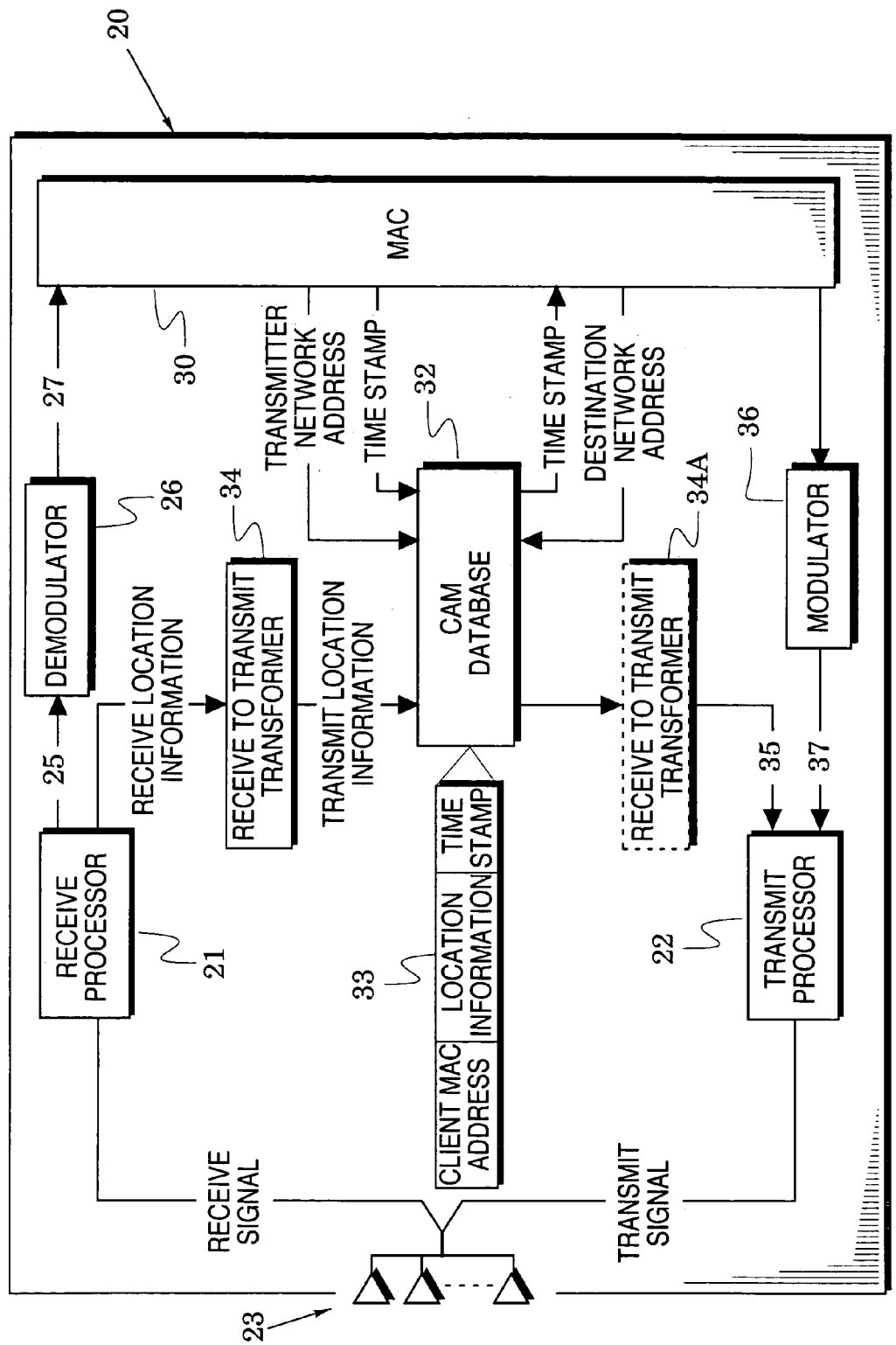
FIG. 1 is a block diagram of a wireless communication device embodiment of the present invention for communications with clients in a communication network.

FIG. 1 illustrates an embodiment 20 of a spatial-processing communications device of the present invention that can be located at a communication hub and which includes a receive processor 21 and a transmit processor 22. In operation, the receive processor 21 obtains receive signals from a plurality of antennas 23 and, in response, processes a spatially processed input signal 25 which is optimized to receive signals from a particular client transmitter. This spatially processed input signal 25 is sent to a demodulator 26 which demodulates the signal and applies forward error correction.

The demodulated signal 27 is sent to a media access controller (MAC) 30 that parses the signal for addressing information, packet type and payload (in the case of a data packet). In general, the MAC 30 performs all of the functions normally associated with a media access control section of a wireless communications device. Additionally, the MAC stores in a database 32 the transmit address of the device that transmitted the signal and a corresponding timestamp, which is comprised of a relative or absolute value representing the current time.

In response to the receive signal, the receive processor 21 also outputs receive location information which may comprise, for example, direction of arrival, antenna number, beam number, or a phase and amplitude vector, depending on the type of spatial processing utilized. This receive location information is optionally transformed to transmit location information by a receive to transmit transformer 34 wherein the transform employed is based on the type of spatial processing and may be a unity transform.

In different embodiments, this transform may be applied prior to storing the location information in the database 32, or after retrieving it from the database for use in the transmit processor 22. Accordingly, the receive to transmit transformer 34 is shown to have an alternate position 34A (shown in broken lines) between the CAM database 32 and the transmit processor 22.

Location information, network address of the transmitter (client address) and the timestamp are all stored as a record or series of records (note exemplary record 33) in the database 32 which is preferably based on content addressable memory (CAM), that is implemented through some combination of software memory access protocols and/or hardware circuitry. The database 32 is preferably accessed with the network address.

When the MAC 30 determines that it wishes to transmit a signal, it outputs the destination MAC address to the CAM database 32. The CAM database then outputs location information and a corresponding timestamp which provides the location information with a validity lifetime.

Time coherence of the channel is defined as the amount of time that location information may be relied upon as accurate. The MAC 30 may be configured to keep track of the time coherence of the channel either on a unit specific, unit grouping or on an overall network basis. Time coherence value(s) may be static based on known channel models or may be modified by the MAC 30 based on the rate of change of location information for specific clients, groups of clients or the overall network. Time coherence of the channel may be determined by exemplary methods that include:

a) a value that is programmed into the MAC for the specific application, b) a value that starts with a default value programmed into the MAC, but is updated based on the observed rate of change of location information for a particular device, and c) values programmed or calculated for each specific device, for groups of devices in the network, or for the entire network.

The difference between the time stamp and the time the location information is to be used represents the age of the location information. The MAC 30 (or another processor) compares this timestamp and the current time to determine the age of the location information. In this way, the MAC determines that the location information is still valid by ensuring that the age of the location information is less than the applicable coherence time of the corresponding channel.

Location information that is deemed to be fresh (i.e., newer than the time coherence of the channel) may be optionally transformed by the receive to transmit transformer (in its location 34A). Fresh location information 35 is then passed to the transmit processor 22. The output signal to be transmitted (provided by the MAC 30) is modulated by a modulator 36 and the modulated output signal 37 is also passed to the transmit processor. In response to the location information 35 and the modulated output signal 37, the transmit processor 22 processes (per its rules of spatial processing) a transmit signal for delivery to the antennas 23.

If the communication device 20 is a system hub, its CAM database 32 associates client location information with a corresponding client network address. Stored location information can be in the exemplary forms of:

a) a selected antenna (in a switched antenna process), b) a selected beam (in a switched beam process), c) a phase/amplitude signal that is multiplied by each antenna (in an analog beamforming process), d) a set of complex coefficients that are multiplied by a number of antennas or antenna elements (in a digital beamforming process), or e) various other forms of location information, depending on the nature of the spatial processing. It is noted that in some embodiments, the location information may not indicate true location but rather, be a specific set of parameters that optimizes the spatial processing for communication with a particular client. The general term location information is used for descriptive clarity.

If the location information is older than the time coherence of the channel (or if location information is not available for the desired MAC address) then the MAC 30 requires new location information in order to use spatial processing optimized to the target client. In this case, a location update is preferably derived in exemplary methods described below.

Figure 2A:
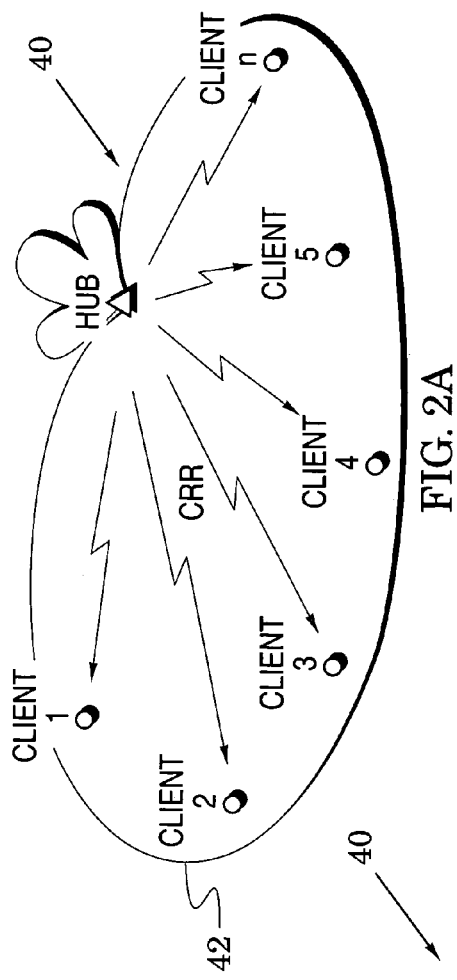
FIGS. 2A–2F are diagrams that illustrate client communications with the structure of FIG. 1, FIGS. 3A–3C are diagrams that illustrate further client communications with the structure of FIG. 1, FIGS. 4A–4E are diagrams that illustrate further client communications with the structure of FIG. 1.
Figure 2B:
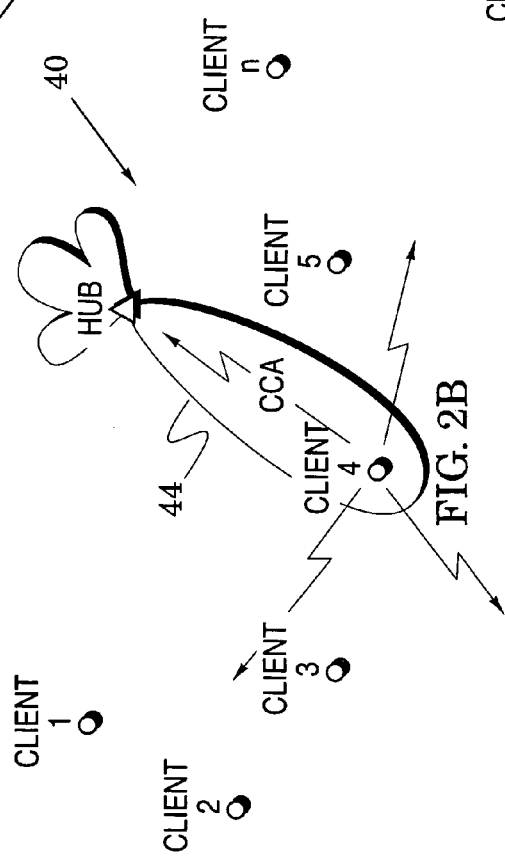
Figure 2C:
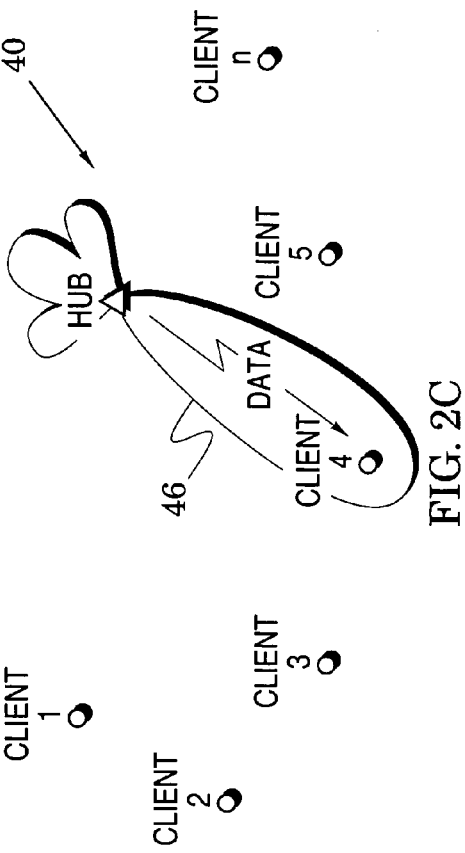

FIGS. 2A–2C illustrate a communication system 40 formed with a communication hub and a plurality of clients (i.e., client communication devices) shown as clients 1 through n. The system 40 preferably uses a CSMA/CA MAC protocol and the hub is configured to provide spatial processing. For example, the hub device is configured as shown in FIG. 1.

It is initially assumed that the hub has data it desires to transmit to client 4. However, the hub determines that the location information in its database (32 in FIG. 1) for client 4 is older than the time coherence of the channel or does not exist. As shown in FIG. 2A, the hub thus transmits a CRR using a broad antenna beam 42 that is directed to all clients in the network. Depending on the type of spatial processing utilized, such a pattern may be an omni-directional antenna pattern or a pattern that is particularly optimized for transmission to all clients based on location information for those clients in the database.

In FIG. 2B, client 4 has received the CRR and is responding with a CCA. The hub receives this signal by forming a beam 44 that is spatially optimized for communication with client 4. The hub then updates the location information for client 4.

In FIG. 2C, the hub uses the updated location information for client 4 (e.g., as processed through the receive to transmit transformer 34 of FIG. 1) to form an optimum beam 46 that transmits the desired data to client 4 wherein the beam 46 may be similar to the beam 44.

FIGS. 2A–2C illustrate processes in which location information is ascertained during the process of receiving, at the hub, a signal transmitted by a specific client. In general, location information required to transmit to a client is derived by applying a transform to the location information wherein the transform is facilitated with a received and recent (based on the time coherence of the channel) transmission from that client.

For example, in a switched beam or switched antenna system, the transform may be units and the location information is the antenna or beam selected for reception. In this case, transmission to a specific client uses the same antenna that was optimized to receive data from that same client. In another example, a transform in a digital beamforming system may involve conjugation in the frequency domain or time reversal in the time domain, transformed by some hardware specific parameter.

In a contention based MAC (e.g., a CSMA/CA MAC) a particular client may be forced to respond to a data transmission in the form of an acknowledgement or a CCA. In the case of forcing a CCA response, the hub would generally transmit a CRR. Since location information is not known at the time of the transmission of the CRR, the request may be transmitted without spatial processing or may be transmitted with spatial processing that is optimized to transmit to all clients (derived based on some historical accumulation of all location information), or may be transmitted based on a prediction of location information based on history of location information for that particular client.

Because transmission with no spatial processing provides no additional gain, and since there is a benefit to having all clients receive the CRR (to allow them to adjust their CRT to indicate a virtual channel busy), the preferred approach is to transmit to all clients to thereby achieve some spatial processing gain while communicating the channel reservation information to all clients.

Figure 2D:
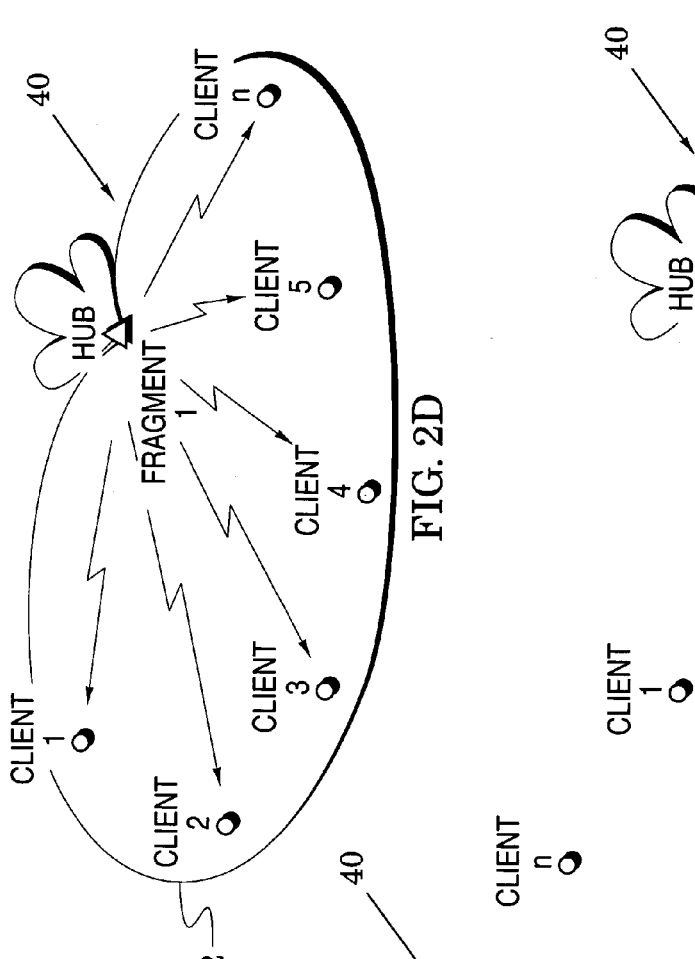
Figure 2F:
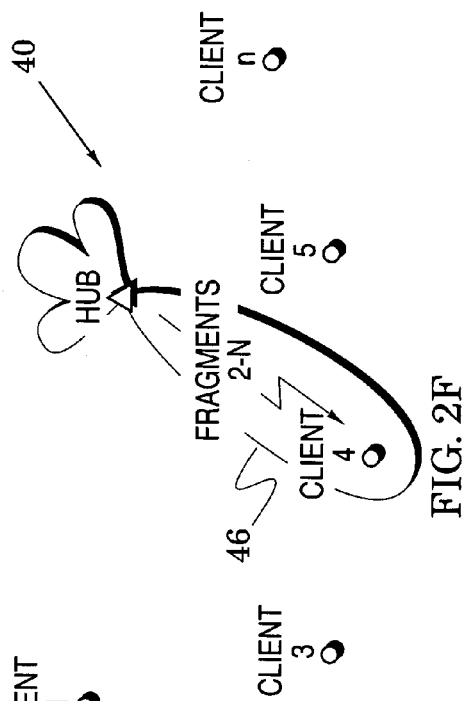
Figure 2E:
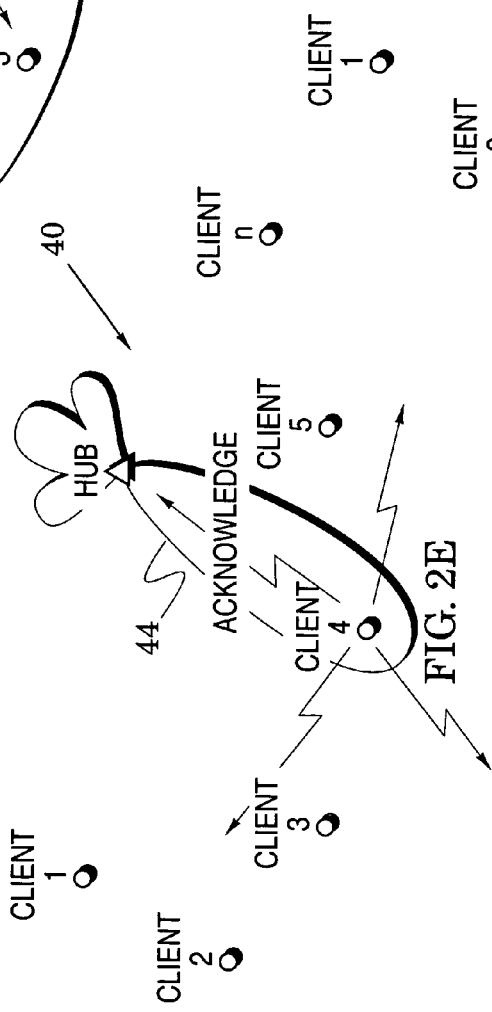

FIGS. 2D–2F are similar to FIGS. 2A–2C with like elements indicated by like reference numbers. In FIG. 2D, the hub desires to transmit data to client 4, but has determined that the location information in its database (32 in FIG. 1) for client 4 is old, based on the time coherence of the channel. Accordingly, the hub fragments the desired data to be transmitted into fragments 1-N, wherein the size of fragment 1 is adjusted to minimize overhead and maximize throughput (given the size of the overall data to be transmitted and other packet and acknowledgement overheads and the expected transmission modulation and error correction rate).

FIG. 2D shows that the hub transmits packet fragment 1 using the antenna pattern 42 directed to all clients in the network. As stated above, this pattern may be an omni-directional antenna pattern or a pattern that is particularly optimized for transmission to all clients based on location information in the database for those clients.

In FIG. 2E, client 4 has received packet fragment 1 and has sent an acknowledge message. The hub receives this acknowledge signal by forming the beam 44 optimized for communication with client 4. The hub then updates the location information for client 4 and FIG. 2F shows that the hub uses the updated location information for client 4 (e.g., as processed through the receive to transmit transformer 34 of FIG. 1) to form the optimum beam 46 that is used to transmit the remaining packet fragments 2-N to client 4.

The drawback of using the CRR and CCA messages (as in FIGS. 2A–2C) is that the added overhead of using these mechanisms may offset the increased data rate benefits of the spatial processing employed. Therefore, a potentially more efficient method of achieving a similar result is to fragment the packet to allow transmission of the first fragment without spatial processing, with spatial processing that is optimized to transmit to all clients, or based on a prediction of location information for that particular client.

Upon proper receipt of packet fragment 1 by the intended recipient, an acknowledgement is returned. The acknowledgement allows the hub to then update location information for the particular client for use in spatial processing for the remainder of the packet transmission. In systems where data transmissions contain CRTs, the CRT from the first packet may be used by other clients to determine that the channel will be busy for a prescribed period of time—generally the estimated time to complete the transmission of all packet fragments and their respective acknowledgements.

Therefore, a preferred approach is to transmit packet fragment 1 to all clients. The advantage of this approach over the CRR/CCA approach is that the first packet fragment contains data so that the handshake process of updating spatial information actually carries some data—depending on the relative overhead of the CRR/CCA approach, versus fragmentation, usable data transmissions in the network may be increased. The size of the packet fragment 1 is determined by the MAC (30 in FIG. 1) based on parameters such as programmable thresholds, the channel quality on the last reception/transmission to the specific client, the size of the overall packet, the packet overhead, and/or the overhead in acknowledgements.

Figure 3B:
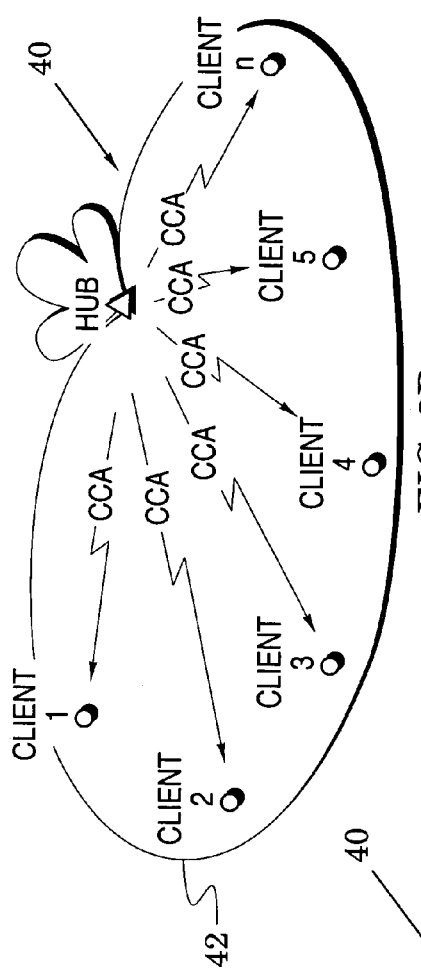
Figure 3A:
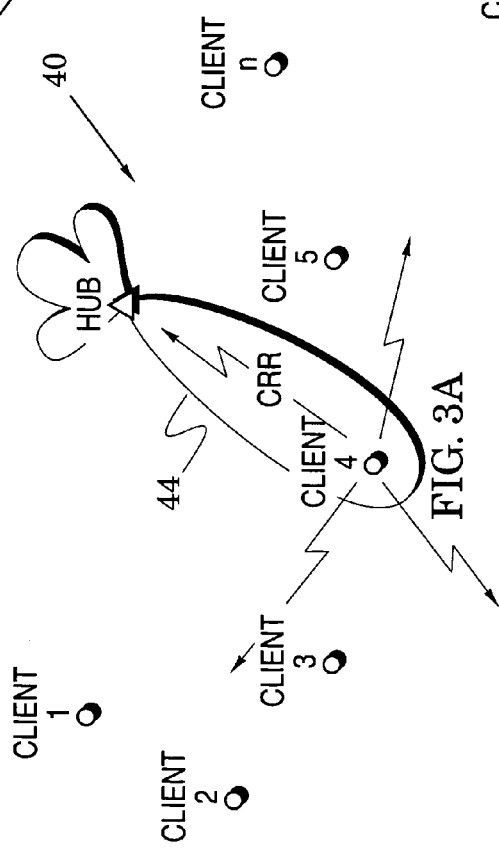
Figure 3C:
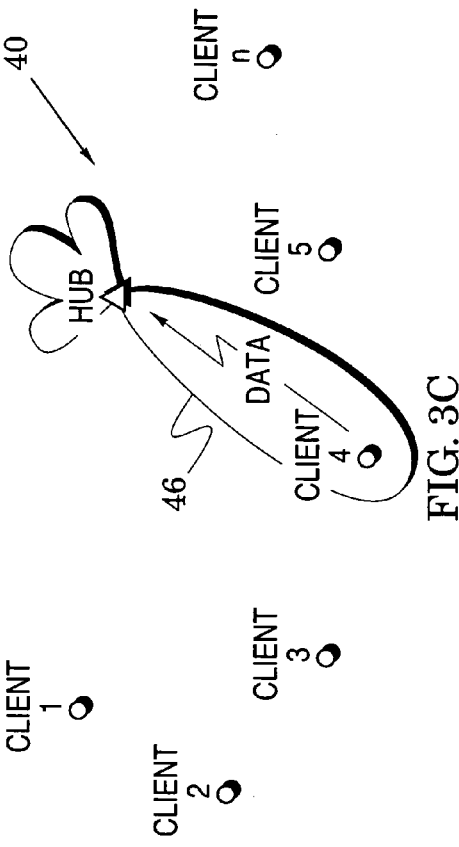

FIGS. 3A–3C are similar to FIGS. 2A–2C with like elements indicated by like reference numbers. FIGS. 3A–3C again illustrate the communication system 40 that is also directed to a network that has a hub with spatial processing and n clients. Client 3 wishes to transmit to the hub and, in order to reserve the channel, client 3 transmits a CRR to the hub. This is shown in FIG. 3A where the hub receives this signal by forming the beam 44 optimized for communication with client 3.

In FIG. 3B, the hub responds with a CCA directed to all the clients in the network, to thereby reserve the channel for the entire transaction. Accordingly, the hub forms the broad antenna beam 42 that is directed to all clients in the network. As stated above, such a pattern may be an omni-directional antenna pattern or a pattern that is particularly optimized for transmission to all clients based on location information for those clients in the database. All clients in the network thus recognize that the channel is reserved.

Finally, client 4 transmits data in FIG. 3C and the hub receives the data using the beam 46 that is optimized for communication with client 3.

The processes illustrated in FIGS. 3A–3C concern transmission of data from a specific client to the hub. In a network where clients may not be able to receive the transmissions of other clients directly, the client transmits a CRR to the hub. The hub responds with a CCA without spatial processing or with spatial processing that is optimized to transmit to all clients. The remaining clients also receive the CCA and therefore use the CRT contained therein to determine that the channel is busy for the prescribed period of time. This ensures that spatial processing does not create other network contention problems.

Figure 4A:
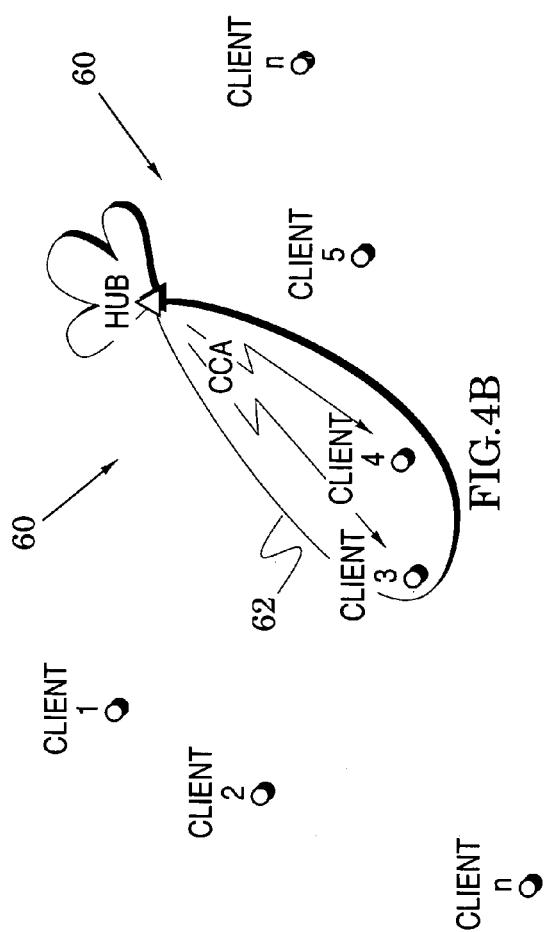

FIGS. 4A–4E illustrate a communication system 60 that has a hub which is enabled with multiple modems so that it can receive and transmit data from and to multiple sources simultaneously. In FIG. 4A, client 4 wishes to transmit data to the hub and transmits a CRR.

The hub receives this signal by optimizing a beam 62 for communication with client 4 and updates its location information for client 4. However, due to the locations of clients 3 and 4 and the nature of the communications channel, the beam 62 optimized for client 4 also illuminates client 3.

Figure 4B:
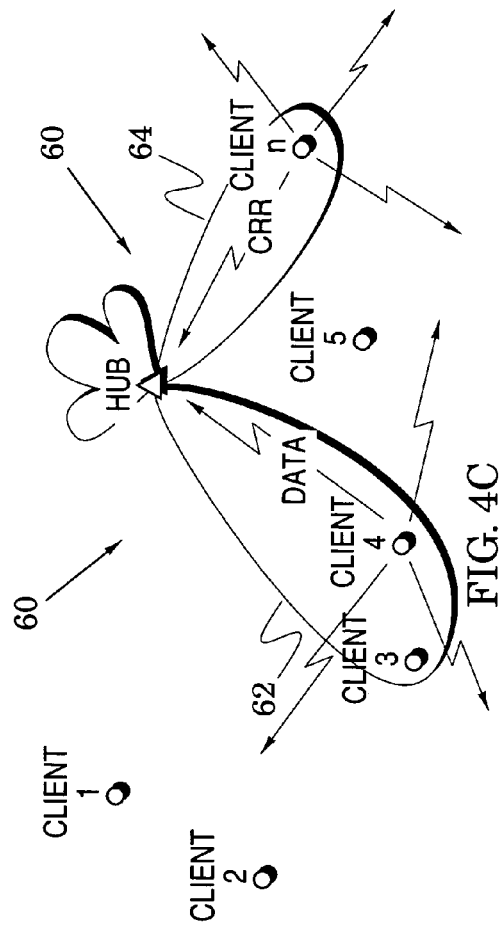

In FIG. 4B, the hub responds to the CRR with a CCA using the location information for client 4 that is suitably transformed for transmission. The hub transmits the CCA to client 4 but, as in reception of the CRR, the beam 62 also illuminates client 3. Client 3 therefore recognizes that the channel is busy for the duration of the transaction between client 4 and the hub.

Figure 4C:
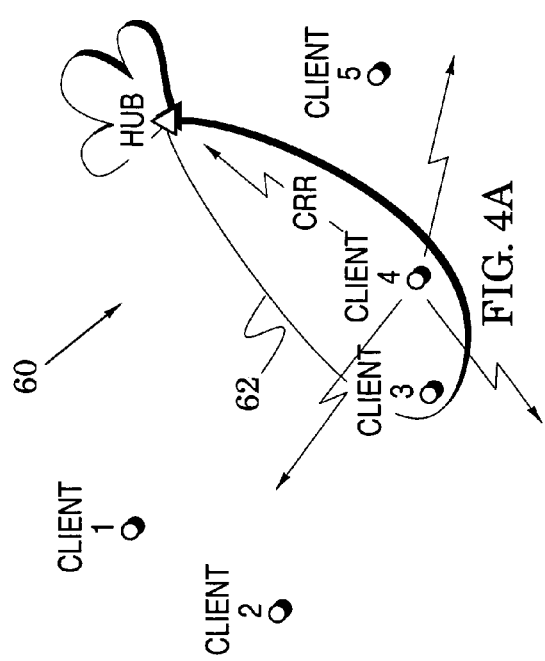

In FIG. 4C, client 4 transmits the desired data to the hub where it is processed with one of the modems. However, other clients in the network do not recognize the channel busy status because they have not received the CRR from client 4 or the CCA from the hub. Therefore other clients in the network may contend for the channel.

For example, client n transmits a CRR to the hub in FIG. 4C. Due to the reciprocity of the transmit and receive beams, and since client n did not hear the CCA transmitted to client 4 in FIG. 4B, client 4's transmission does not significantly interfere with reception of data transmitted by client 4. The hub recognizes the CRR from client n and forms a beam 64 optimized for communications with client n.

In FIG. 4D, the hub responds to clientn's CRR with a CCA, transmitted over beam 64 using location information optimized for client n, suitably transformed for transmission. In FIG. 4E, client n and client 4 are both transmitting data which the hub receives with beams 62 and 64 and processes with respective ones of its modems. The system's MAC (e.g., MAC 30 of FIG. 1) has thus been modified to allow simultaneous communication with multiple clients using spatial multiplexing. Communications with client 4 and client n may use different or the same frequencies, depending on the isolation capabilities of the antenna array and the form of spatial processing used.

The processes of FIGS. 4A–4E are directed to a spatial processing hub that has the capability to transmit and receive to/from different clients simultaneously because it includes multiple modems for processing of receive and transmit signals (i.e., the hub has the capability for spatial multiplexing).

The above described scenario involves a CSMA/CA contention based MAC where clients may not be able to receive each others' transmissions. A client wishes to transmit to a network hub in a network and accordingly, transmits a CCR. The hub responds with a CCA but in this scenario, uses spatial processing optimized to the client.

All clients that can receive the transmission will determine that the channel is busy for the prescribed period of time through the use of the CRT. However, the clients that do not receive the transmission will not recognize that the channel is busy. Therefore, they will contend for the channel using similar mechanisms.

Since an artifact of spatial processing is that transmission and reception are reciprocal in direction (if a specific client cannot receive signals from a specific hub beam, then that client will not interfere when the hub receives with that same beam), these clients that contend for the channel do not interfere with the reception of the first client. In this manner, a single hub may communicate with a number of clients simultaneously on the same frequency, using spatial parameters to multiplex communication links.

FIG. 5A is a time diagram 80 that is directed to a typical transaction between a client and a hub in a conventional communication system. As shown in a client time line, a client that wishes to transmit data sends a CRR 82 to the hub. As shown in a hub time line, the hub responds by transmitting a CCA 83 to the client a period of time $T_S$ after the end of the received CRR message. The client involved in the transaction then transmits data 84 a period of time $T_S$ after the end of the CCA signal it received. Finally, the hub transmits an acknowledgement ACK 86 a period of time $T_S$ after the end of the received data transmission.

In systems that do not use any form of spatial processing, the CRR may be heard by clients that are near the transmitting client. However, since it is assumed that all clients are communicating with the hub, the CCA message is received by all clients and therefore, the CRT incorporated within the CCA messages is used by clients not involved in this transaction as recognition that the channel has been reserved—in essence creating a Virtual Channel Busy. The CRT reserves the channel for the entire length of the transaction (to the end of the ACK 86).

This conventional CSMA/CA approach has been implemented in systems that were designed to be used for short-range communications, where the propagation times for signals to reach the intended receiver are short enough to allow efficient exchange. Moreover, such systems have timing parameters that have been programmed into existing equipment to account for these short propagation delays. If such a system is used in applications where the propagation delay is sufficiently long, the exchange described above breaks down, because the time parameters used in the equipment do not account for longer propagation delays.

The time diagram 90 of FIG. 5B is directed to a system of the invention which has extended communication ranges that introduce a significant propagation delay $T_P$. Again, the client sends a CRR 82 to the hub which responds by transmitting a CCA 83 to the client a period of time ($T_S$) after the end of the received CRR message. However, the hub receives the CRR 82 after a propagation delay $T_P$ introduced by the extended range. The CCA 83 is also delayed by the propagation delay $T_P$ and the roundtrip delay $2T_P$ may be sufficient to cause the response CCA 83 from a standard hub to arrive so late that the client misses its receipt because of client internal timeouts.

In a modified hub of FIG. 5B that is modified for the present invention, the round-trip propagation delay to each client is measured and tracked by using transactions. This can be accomplished in a variety of ways, one of which is to transmit a signal that requires a response by the client $T_S$ after the end of the received signal. By measuring response time, an estimate of $2T_P$ can be generated. This estimate may be updated through any transaction that requires the client to respond to a hub-generated message after a pre-defined period of time.

It is noted that the estimate of $2T_P$ should preferably be stored in a database on a client-by-client basis. A process very similar to that described above (with reference to FIG. 1) may be used, wherein a CAM-based database (32 in FIG. 1) is used to store this information on a MAC address basis, and is aged based on a timestamp (also stored in the database). Older $T_P$ estimates may be updated through the initiation of a transaction with little or no compensation for propagation delay, or an estimate of propagation delay based on historical information.

Assuming that the hub has generated and stored an estimate of $T_P$ for a particular client, it responds to the CRR 82 message from that client with a CCA 93 that is advanced by $2T_P$ such that it arrives at the client $T_S$ after the CRR transmitted signal as shown in FIG. 5B. The client then transmits data 84. Similarly, rather than sending an acknowledgement $T_S$ after the end of the received data, the modified hub advances the timing of its acknowledgement response 96 by $2T_P$ such that it arrives at the client $T_S$ after the data is transmitted. Preferably, the hub increases the CRT within all of its messages related to this transaction to reserve the channel for the time required for this modified transaction, accounting for the estimated propagation delay associated with all clients in the network, thereby minimizing transmission collisions.

In this manner, the hub accommodates the increased propagation delays, while still communicating with commercially available clients that are optimized for lower propagation delays. Moreover, this modification utilizes the channel more efficiently than merely extending the timeouts in existing clients (if this were possible), by minimizing delays in the network.

The processes shown in FIG. 5B take advantage of the coverage (distance) gains of spatial processing to communicate with an existing universe of clients. In general, a wireless communications system may be optimized for a range of propagation delays for transmissions from the hub to the client and the client to the hub.

In conventional systems (e.g., a CSMA/CA MAC system) a transmitter waits for a predetermined amount of time before deciding that the packet was not acknowledged and therefore lost. However, with the increased coverage ranges (distances) associated with spatial processing of the invention, the associated increase in propagation delay may cause the transmitter to determine a packet is lost even though the acknowledgement is in transit.

To communicate with an existing universe of clients that were designed for communication at shorter distances, a hub of the invention preferably maintains an estimate of the propagation time between a specific client and the hub. Specifically, the hub transmits information to a specific client that requires a response and measures the delay in the response. Based on its understanding of the MAC standard employed by the client, the hub may calculate the propagation delay.

For example, if the client MAC is programmed to respond with an acknowledgement in 16 microseconds and the acknowledgement is actually received 26 microseconds after the hub transmitted data, then the roundtrip propagation delay is 10 microseconds. This propagation delay information may be stored on a client address basis in a database similar to the one described above with reference to FIG. 1. Similarly, a timestamp will declare the age of the propagation delay information and after the certain period of time, the delay will have to be re-measured to account for situations where either the hub or client is moving.

The propagation delay can be used in at least the following ways:

a) when the hub transmits data to a client, it will wait a period of time that will accommodate the additional propagation delay—in the example above, the hub will recognize that the acknowledgement will be received 26 microseconds after the end of its transmission, rather than the expected 16 microseconds, b) when the client transmits information to the hub, the hub transmits acknowledgements advanced by the expected propagation delay—in the example above, if the client expected an acknowledgement 16 microseconds after it transmitted its signal, the hub will advance the acknowledgement by 10 microseconds (transmit the acknowledgement in 16−10=6 microseconds), so that it will arrive at the client 16 microseconds after the client transmission ended, and c) the hub adjusts the CRT (channel reservation time) in all transmissions associated with that transaction to reserve the channel for a longer period of time to accommodate the increased propagation delays.

In these exemplary manners, the hub accommodates the increased propagation delays associated with the expanded coverage while still maintaining an ability to communicate with commercially available clients that expect shorter propagation delays.

It is noted that these mechanisms may be utilized in non-spatial processing systems that use increased antenna gains to increase coverage. Therefore, this description is not intended to limit its applicability to spatial processing systems, but rather to describe a mechanism by which a hub may communicate with an existing set of clients in environments that encounter excessive delays—probably, but not necessarily due to propagation.

Figure 6:
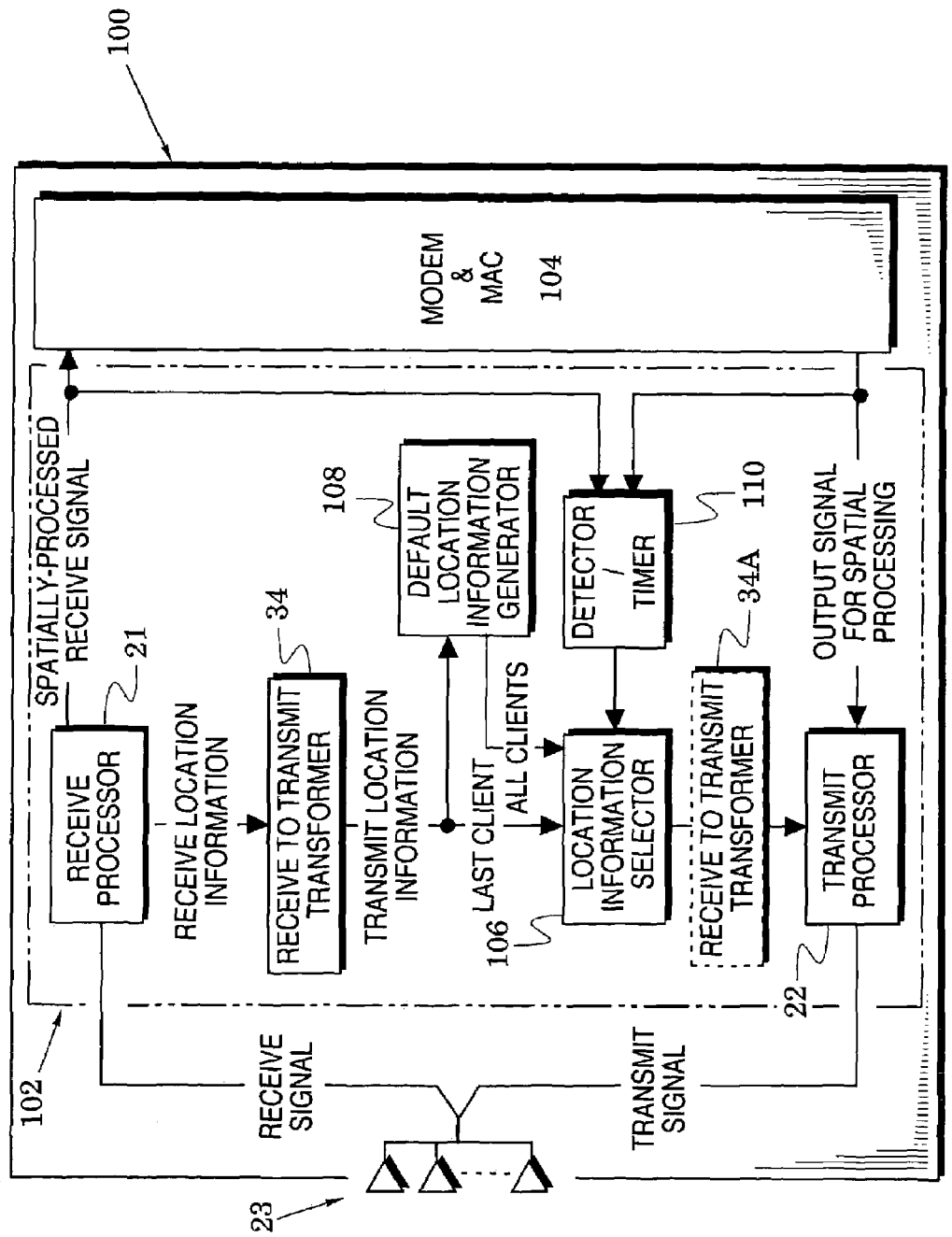
FIG. 6 is a block diagram of another wireless communication device embodiment.

FIG. 6 illustrates a spatial-processing communications device 100 of the present invention that is formed by adding a spatial-processing preprocessor 102 to an existing hub modem and MAC 104. The preprocessor includes the receive processor 21, transmit processor 22, antennas 23, and receive to transmit transformer 34 that were described above with reference to the communications device 20 of FIG. 1.

In operation, the receive spatial preprocessor 102 receives a signal from the antennas 23 and outputs a spatially processed signal, which is optimized to receive signals from the particular transmitter that sent the signal. This spatially processed signal is sent to the hub modem and MAC 104 for signal reception. The modem section demodulates the signal and the MAC section performs all of the functions normally associated with a media access control section of a wireless communications device. In particular, the modem and MAC provides a transmit signal for spatial processing to the transmit processor 22.

In addition to a spatially processed signal, the receive processor 21 also outputs receive location information (e.g., in the form of direction of arrival, antenna number, beam number, or a phase and amplitude vector, depending on the type of spatial processing utilized). This location information is transformed to transmit location information by the receive to transmit transformer 34.

In the embodiment of FIG. 6, the transformed location information is provided to a location information selector 106 and to a default location information generator 108. The default location information generator generates location information (transmit or receive, based on whether the receive to transmit transformer is in position 34 or 34A) for transmission to all clients. This may be performed in various ways, e.g., either through preprogramming with a default set of information or derivation through historical location information. It is noted that the receive to transmit transformation may be applied prior to selecting location information (as indicated by the receive to transmit transformer location 34), or after selection by the location information selector 106 (as indicated by the receive to transmit transformer location 34A).

The location information selector 106 chooses between the location for all clients (provided by the default location information generator 108) and the location of the client from which the last transmission was received (provided by the receive to transmit transformer 34) under direction from a detector/timer 110. The selected location information is provided to the transmit processor 22 which uses the location information to process, per its rules of spatial processing, the transmit signal for spatial processing that is provided by the modem and MAC 104. This processing generates a transmit signal that is provided to the antennas 23 for radiation to clients.

The detector/timer 110 measures the time difference between the end of a receive signal and the start of the subsequent transmit signal. If this time is less than a preprogrammed value, then the location information selector 106 is instructed to select the location information derived from the last received signal. If it is greater than the preprogrammed value, then it is instructed to select the default location information.

It is noted that although this is a two way selection based on a single measure of time, for more complex MAC embodiments that support multiple predefined time intervals, other time measures may be used to select between a plurality of location information (either default or calculated by historical location information) and that is derived from the last received signal. In the embodiment of FIG. 6, the preprogrammed value is envisioned to be the average of the longest $T_S$ limit and the shortest $T_L$ limit.

The processes of FIG. 6 involve the integration of a smart antenna in the absence of tracking location information. These processes are especially applicable to CSMA/CA protocols wherein messages within a transaction are separated by a defined period of time ($T_S$) and messages initiating new transactions are separated by another longer defined period of time $T_L$. Rather than the tight coupling of location information contemplated in the structures of FIG. 1, this timing relationship is exploited with a number of other mechanisms to apply spatial processing. This approach is particularly advantageous when developing a smart antenna that must work with commercially available hubs and without significant modification to these hubs.

To accomplish this, a smart antenna is implemented wherein transmit spatial processing is based on at least two choices for location information. One choice is a default set of location information that transmits to all clients. Another choice is the location information derived from the most recent received message. A timer is preferably used to measure the time delay between the end of a received packet and the beginning of the subsequent transmit packet. If this time difference is closer to $T_S$ than $T_L$, then the location information from the previous received packet is used. If the time different is closer to $T_L$ than $T_S$, then the default location information representing transmission to all clients is used.

In different embodiments of the invention, elements of the invention (e.g., receive and transmit processors 21 and 22, MAC 30, and receive to transmit transformer 34 in FIGS. 1 and 6 and location information selector 106, default location information generator 108 and detector/timer 110 of FIG. 6) may be realized with various conventional structures (e.g., at least one of gate arrays, appropriately-programmed digital processors and combinations thereof).

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A wireless communication device for communications with clients in a communication network, the device comprising:
   at least one antenna;
   a receive processor that processes receive signals from said antenna and provides corresponding receive location information;
   a media access controller that receives signals from said receive processor and provides output signals for transmission;
   a location-information transformer that transforms said receive location information into transmit location information; and
   a transmit processor that provides transmit signals to said antenna in response to at least one of said output signals and said transmit location information;
   wherein said media access controller compares the age of said receive location information with a predetermined time coherence and said transmit processor is configured to provide a transmit signal to said antenna that is:
   spatially processed in accordance with said transmit location information if said age is less than said time coherence; and
   spatially processed in accordance with predetermined location information if said age exceeds said time coherence.

2. The communication device of claim 1, wherein said media access controller is configured to establish said time coherence from at least one of a predetermined value and a default value updated with observed changes of said receive location information.

3. The communication device of claim 1, further including a database for storage of said receive location information and said age.

4. The communication device of claim 1, wherein said media access controller is configured to direct spatial processing of said receive processor and said transmit processor.

5. The communication device of claim 1, further including a modem that demodulates signals from said receive processor and modulates said output signals.

6. A wireless communication device for communications with clients in a communication network, the device comprising:
   at least one antenna;
   a receive processor that processes receive signals from said antenna and provides corresponding receive location information;
   a media access controller that receives signals from said receive processor and provides output signals for transmission;
   a location-information transformer that transforms said receive location information into transmit location information; and
   a transmit processor that provides transmit signals to said antenna in response to at least one of said output signals and said transmit location information;
   wherein said media access controller is configured to:
   command said transmit processor to spatially process an output signal carrying a channel reservation request in accordance with predetermined location information that corresponds to all of said clients; and
   command said receive processor to spatially process a receive signal to enhance receipt of a clear channel acknowledgment from one of said clients and to provide corresponding receive location information to said location-information transformer.

7. The communication device of claim 6, wherein said media access controller is configured to subsequently command said transmit processor to spatially process a data-carrying output signal in accordance with transmit location information from said location-information transformer.

8. The communication device of claim 7, wherein said media access controller is configured to:
   send a first data fragment of said data-carrying signal along with said channel reservation request; and
   send remaining data fragments of said data-carrying signal in said output signal.

9. A wireless communication device for communications with clients in a communication network, the device comprising:
   at least one antenna;
   a receive processor that processes receive signals from said antenna and provides corresponding receive location information;
   a media access controller that receives signals from said receive processor and provides output signals for transmission;
   a location-information transformer that transforms said receive location information into transmit location information; and a transmit processor that provides transmit signals to said antenna in response to at least one of said output signals and said transmit location information;

wherein said media access controller is configured to:

command said receive processor to spatially process a receive signal to enhance receipt of a channel reservation request from one of said clients and to provide corresponding receive location information to said location-information transformer; and command said transmit processor to spatially process an output signal carrying a clear channel acknowledgment wherein said process is in accordance with predetermined location information that corresponds to all of said clients.

10. The communication device of claim 9, wherein said media access controller is configured to subsequently command said receive processor to spatially process a data-carrying receive signal in accordance with transmit location information from said location-information transformer.

11. A wireless communication device for communications with clients in a communication network, the device comprising:

at least one antenna;

a receive processor that processes receive signals from said antenna and provides corresponding receive location information;

a media access controller that receives signals from said receive processor and provides output signals for transmission;

a location-information transformer that transforms said receive location information into transmit location information; and a transmit processor that provides transmit signals to said antenna in response to at least one of said output signals and said transmit location information;

further including a plurality of modems for demodulating said receive signal and modulating said transmit signal and wherein said media access controller is configured to:

command said receive processor to spatially process first and second receive signals to enhance receipt of channel reservation requests from first and second ones of said clients and to provide corresponding receive location information to said location-information transformer; and command said transmit processor to spatially process first and second output signals carrying clear channel acknowledgments wherein said process is in accordance with said transmit location information.

12. The communication device of claim 11, wherein said media access controller is configured to subsequently command said receive processor to process first and second receive signals to enhance receipt of data from said first and second clients.

13. The communication device of claim 12, wherein said media access controller is configured to measure and store receive and transmit signal propagation delays associated with at least one of said clients.

14. A wireless communication device for communications with clients in a communication network, the device comprising:

at least one antenna;

a receive processor that processes receive signals from said antenna and provides corresponding receive location information;

a media access controller that receives signals from said receive processor and provides output signals for transmission;

a location-information transformer that transforms said receive location information into transmit location information; and a transmit processor that provides transmit signals to said antenna in response to at least one of said output signals and said transmit location information;

wherein said media access controller is configured to measure and store receive and transmit signal propagation delays associated with at least one of said clients; and wherein said media access controller compares the age of said receive location information with a predetermined time coherence and is configured to adjust said age to accommodate said propagation delays.

15. The communication device of claim 14, wherein said media access controller is configured to advance said transmit signals to accommodate said propagation delays.

16. The communication device of claim 14, wherein said media access controller is configured to extend reservation times for said receive and transmit signals associated with a respective one of said clients.

17. The communication device of claim 14, wherein said transmit location information is in the form of at least one of a selected antenna, a selected beam generated by said antenna, a phase/amplitude signal, and a set of complex coefficients.

18. The communication device of claim 14, wherein said receive processor, said media access controller, said location-information transformer and said transmit processor are realized with at least one of a gate array and an appropriately-programmed digital processor.

19. A method for communicating with clients in a communication network, the method comprising the steps of:

processing receive signals obtained from at least one antenna to thereby provide input signals and corresponding receive location information;

in response to said input signals, providing output signals for transmission;

transforming said receive location information to transmit location information; and providing transmit signals to said antenna in response to at least one of said output signals and said transmit location information;

further including the steps of:

comparing the age of said receive location information with a predetermined time coherence;

spatially processing said output signals in accordance with said transmit location information if said age is less than said time coherence; and spatially processing said output signals in accordance with predetermined location information if said age exceeds said time coherence.

20. The method of claim 19, further including the step of establishing said time coherence from at least one of a predetermined value and a default value updated with observed changes of said receive location information.

21. The method of claim 19, further including the step of storing said receive location information and said age.

22. The method of claim 19, wherein said receive signals are spatially processed and said output signals are spatially processed.

23. The method of claim 19, further including the step of demodulating said input signals and modulating said output signals.

24. A method for communicating with clients in a communication network, the method comprising the steps of:
  processing receive signals obtained from at least one antenna to thereby provide input signals and corresponding receive location information;
  in response to said input signals, providing output signals for transmission;
  transforming said receive location information to transmit location information; and
  providing transmit signals to said antenna in response to at least one of said output signals and said transmit location information;
  wherein:
  said providing step includes the step of spatially processing an output signal carrying a channel reservation request in accordance with predetermined location information that corresponds to all of said clients; and
  said processing step includes the steps of spatially processing a receive signal to enhance receipt of a clear channel acknowledgment from one of said clients and providing corresponding receive location information.

25. The method of claim 24, wherein said providing step further includes the step of subsequently spatially processing a data-carrying output signal in accordance with said transmit location information.

26. The method of claim 25, wherein said providing step further includes the steps of:
  sending a first data fragment of said data-carrying signal along with said channel reservation request; and
  sending remaining data fragments of said data-carrying signal in said spatially processing step.

27. A method for communicating with clients in a communication network, the method comprising the steps of:
  processing receive signals obtained from at least one antenna to thereby provide input signals and corresponding receive location information;
  in response to said input signals, providing output signals for transmission;
  transforming said receive location information to transmit location information; and
  providing transmit signals to said antenna in response to at least one of said output signals and said transmit location information;
  wherein:
  said processing step includes the steps of spatially processing a receive signal to enhance receipt of a channel reservation request from one of said clients and providing corresponding receive location information; and
  said providing step includes the step of spatially processing an output signal carrying a clear channel acknowledgment wherein said process is in accordance with predetermined location information that corresponds to all of said clients.

28. The method of claim 27, wherein said processing step further includes the step of spatially processing a data-carrying receive signal in accordance with said transmit location information.

29. A method for communicating with clients in a communication network, the method comprising the steps of:
  processing receive signals obtained from at least one antenna to thereby provide input signals and corresponding receive location information;
  in response to said input signals, providing output signals for transmission;
  transforming said receive location information to transmit location information; and
  providing transmit signals to said antenna in response to at least one of said output signals and said transmit location information;
  further including the steps of:
  independently demodulating a plurality of said input signals;
  independently modulating a plurality of said transmit signals;
  and wherein:
  said processing step includes the steps of spatially processing first and second receive signals to enhance receipt of channel reservation requests from first and second ones of said clients and providing corresponding receive location information; and
  said providing step includes the step of spatially processing first and second output signals carrying clear channel acknowledgments wherein said process is in accordance with said transmit location information.

30. The method of claim 29, further including the step of processing first and second receive signals to enhance receipt of data from said first and second clients.

31. The method of claim 30, further including the steps of measuring and storing receive and transmit signal propagation delays associated with at least one of said clients.

32. A method for communicating with clients in a communication network, the method comprising the steps of:
  processing receive signals obtained from at least one antenna to thereby provide input signals and corresponding receive location information;
  in response to said input signals providing output signals for transmission;
  transforming said receive location information to transmit location information; and
  providing transmit signals to said antenna in response to at least one of said output signals and said transmit location information;
  further including the steps of measuring and storing receive and transmit signal propagation delays associated with at least one of said clients;
  and further including the steps of:
  comparing the age of said receive location information with a predetermined time coherence; and
  adjusting said age to accommodate said propagation delays.

33. The method of claim 32, further including the step of advancing said transmit signals to accommodate said propagation delays.

34. The method of claim 32, further including the step of extending reservation times for said receive and transmit signals associated with a respective one of said clients.

35. The method of claim 32, further including the step of storing said transmit location information in the form of at least one of a selected antenna, a selected beam generated by said antenna, a phase/amplitude signal, and a set of complex coefficients.

* * * * *